(12) United States Patent
Reutter et al.

(10) Patent No.: US 8,143,760 B2
(45) Date of Patent: Mar. 27, 2012

(54) MINIATURE ELECTRICAL DRIVE AND MAGNETIC RETURN PATH ELEMENT, AND METHOD FOR ITS PRODUCTION

(75) Inventors: Kornelius Reutter, Weil im Schönbuch (DE); Jürgen Teufel, Eutingen-Weitingen (DE)

(73) Assignee: Dr. Fritz Faulhaber GmbH & Co. KG, Schonaich (DE)

( * ) Notice: Subject to any disclaimer, the term of this patent is extended or adjusted under 35 U.S.C. 154(b) by 293 days.

(21) Appl. No.: 12/218,461

(22) Filed: Jul. 15, 2008

(65) Prior Publication Data
US 2009/0015093 A1    Jan. 15, 2009

(30) Foreign Application Priority Data
Jul. 13, 2007   (DE) .......................... 10 2007 033 076

(51) Int. Cl.
*H02K 5/00*    (2006.01)

(52) U.S. Cl. ... 310/216.058; 310/216.113; 310/216.114; 310/216.118; 310/216.124

(58) Field of Classification Search ............... 310/254.1, 310/216.058, 216.113, 216.114, 216.118, 310/216.124, 216.001, 216.004, 216.013, 310/216.044, 216.087, 428, 431
See application file for complete search history.

(56) References Cited

U.S. PATENT DOCUMENTS

| | | | | |
|---|---|---|---|---|
| 1,497,734 A * | 6/1924 | Ramoneda | ............. | 310/216.134 |
| 1,816,859 A | 8/1931 | Linders | | |
| 2,151,561 A | 3/1939 | Morril | | |
| 2,650,992 A * | 9/1953 | Forss et al. | ............. | 310/216.131 |
| 2,701,318 A * | 2/1955 | Feiertag | ......................... | 310/402 |
| 3,445,692 A * | 5/1969 | Kato | ................................ | 310/71 |
| 3,600,615 A * | 8/1971 | Morita | ..................... | 310/40 MM |
| 4,403,401 A * | 9/1983 | Rosenberry | ..................... | 29/596 |
| 4,532,446 A * | 7/1985 | Yamamoto et al. | ............. | 310/87 |
| 4,644,204 A * | 2/1987 | Lakin | ............................... | 310/89 |
| 4,709,180 A * | 11/1987 | Denk | .......................... | 310/179 |
| 5,504,382 A * | 4/1996 | Douglass et al. | ......... | 310/156.25 |
| 5,585,682 A * | 12/1996 | Konicek et al. | .................. | 310/89 |
| 5,670,838 A * | 9/1997 | Everton | ................. | 310/216.061 |
| 6,265,801 B1 * | 7/2001 | Hashiba et al. | ............... | 310/214 |
| 6,822,364 B2 * | 11/2004 | Suzuki et al. | ........... | 310/216.012 |
| 6,903,475 B2 * | 6/2005 | Ortt et al. | .................. | 310/154.07 |

(Continued)

FOREIGN PATENT DOCUMENTS

DE   90 10 318   11/1991

(Continued)

OTHER PUBLICATIONS

European Search Report, Jan. 23, 2008, 3 pages.

(Continued)

*Primary Examiner* — Dang Le
(74) *Attorney, Agent, or Firm* — Brinks Hofer Gilson & Lione

(57) ABSTRACT

The present invention relates to a miniature electrical drive (1), in particular a rotating field drive with permanent magnet excitation, having a stator (2) and a soft-magnetic return path element (6) which cylindrically surrounds the stator (2) and has a multiplicity of sheet-metal laminates (22) which are in the form of annular disks and are arranged in layers to form a cylindrical laminated core (20). The sheet-metal laminates (22) in the laminated core (20) are held prestressed exclusively with a force fit and in an interlocking manner in the axial and radial directions, and without adhesive or integral joint means such as this, in a supporting sleeve (24) which coaxially surrounds said sheet-metal laminates (22).

14 Claims, 3 Drawing Sheets

U.S. PATENT DOCUMENTS

| | | | |
|---|---|---|---|
| 7,164,218 B2 * | 1/2007 | Kimura et al. | 310/216.044 |
| 7,511,399 B2 * | 3/2009 | Lung et al. | 310/216.055 |
| 2003/0098628 A1 | 5/2003 | Enomoto et al. | |
| 2005/0269895 A1 | 12/2005 | Innami et al. | |

FOREIGN PATENT DOCUMENTS

| | | |
|---|---|---|
| DE | 42 24 628 | 1/1994 |
| DE | 69004513 | 5/1994 |
| DE | 600 28 427 | 6/2007 |
| EP | 0 410 933 | 1/1991 |
| EP | 1501170 | 1/2005 |
| JP | 5199695 | 8/1993 |

OTHER PUBLICATIONS

Examination Report from the German Patent Office, Feb. 13, 2008, 3 pages.

* cited by examiner

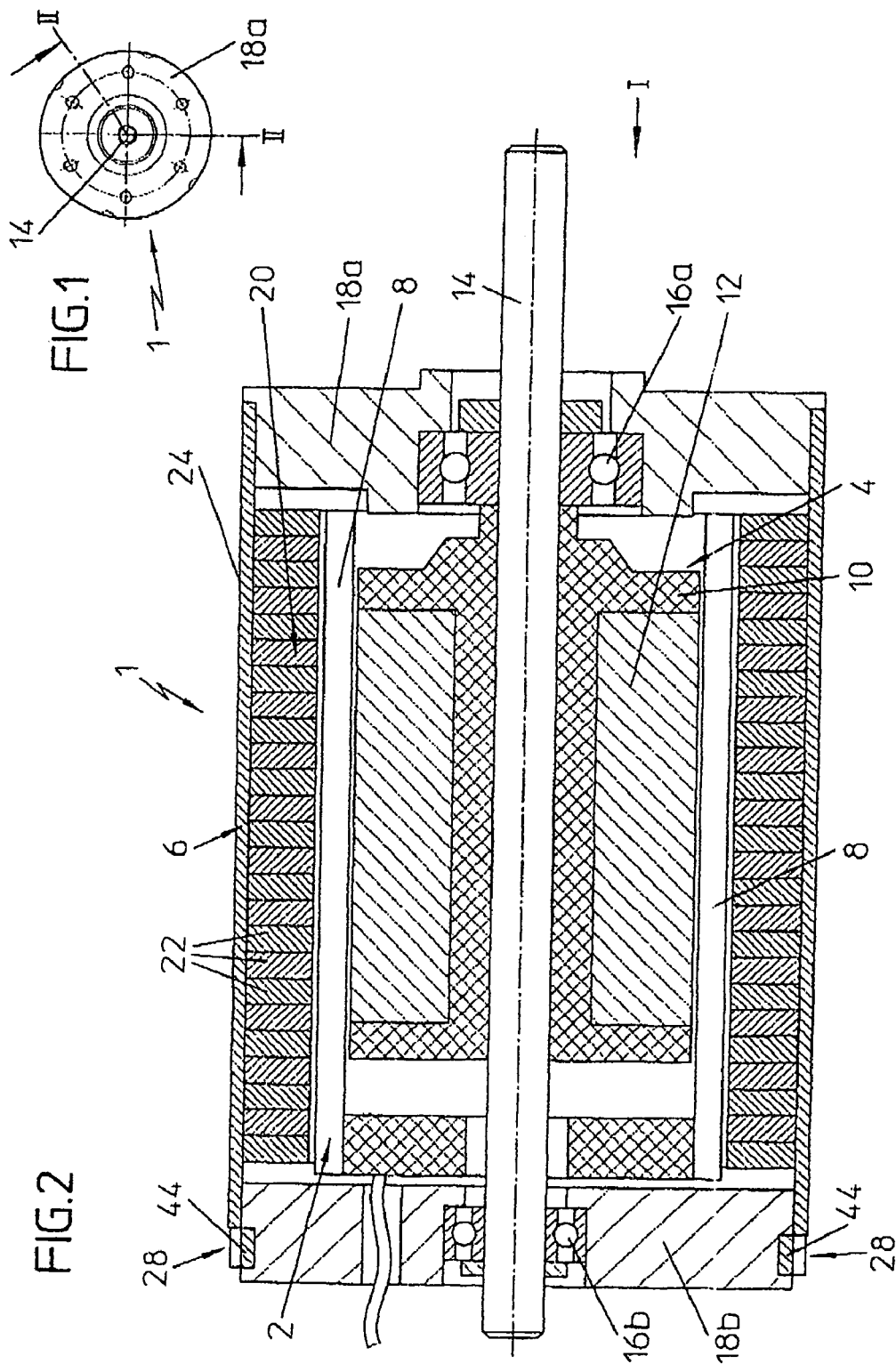

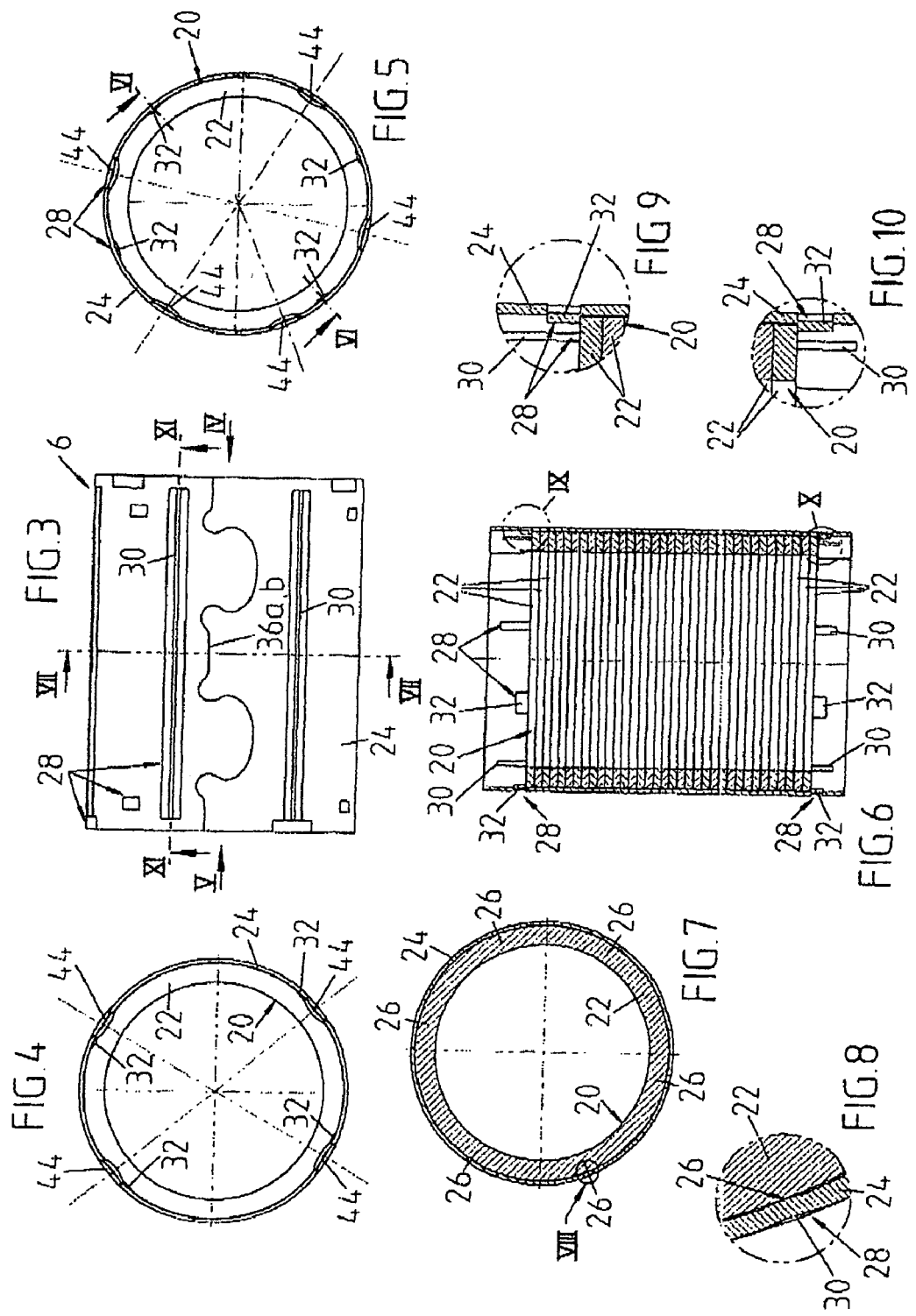

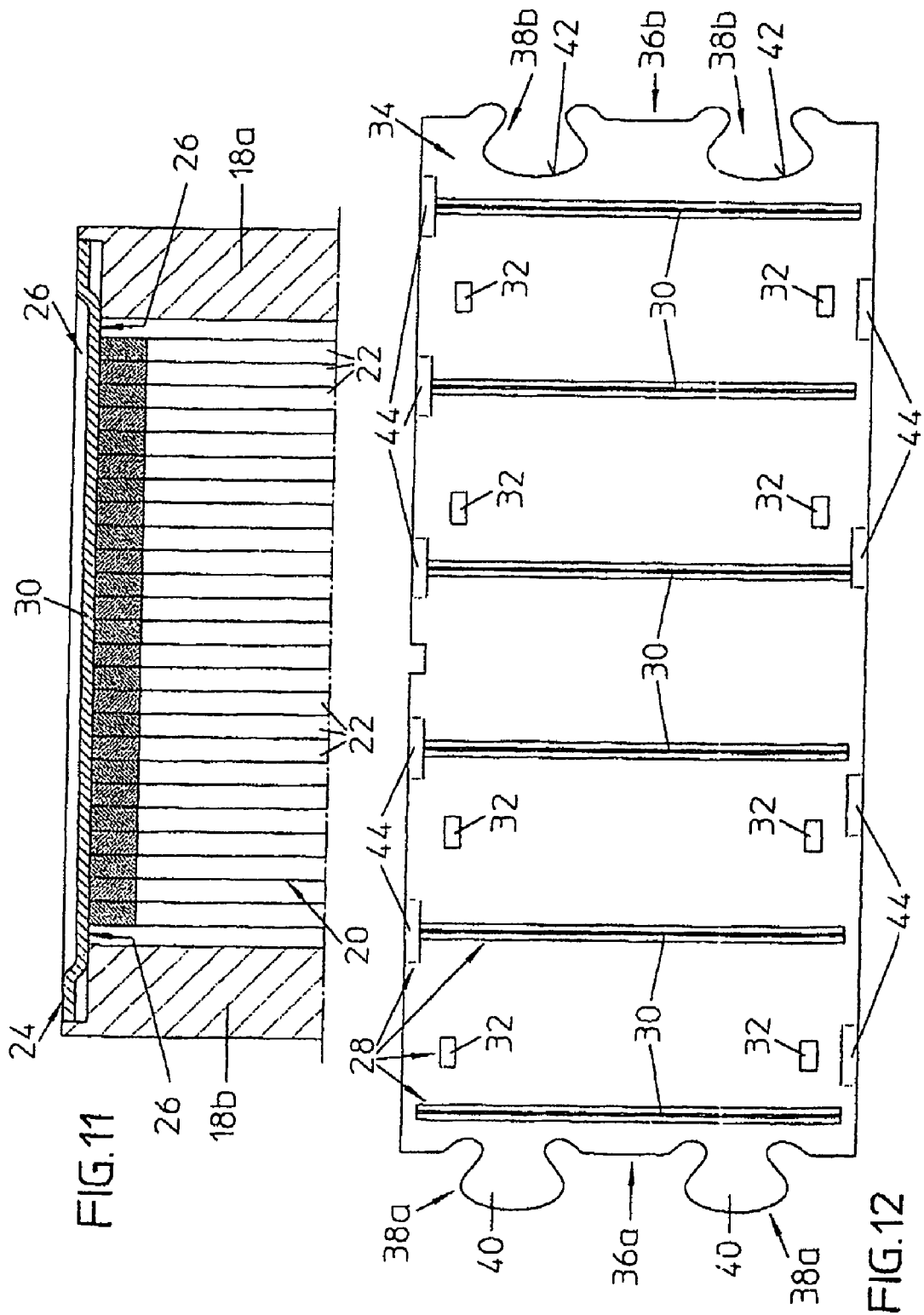

MINIATURE ELECTRICAL DRIVE AND MAGNETIC RETURN PATH ELEMENT, AND METHOD FOR ITS PRODUCTION

BACKGROUND OF THE INVENTION

1. Field of the Invention

The present invention first of all relates to a miniature electrical drive, in particular a rotating-field drive with permanent magnet excitation, having a stator which contains a laminated iron magnetic return path, in the form of a soft-magnetic return path element which cylindrically surrounds the stator and has a multiplicity of sheet-metal laminates which are in the form of annular disks and are arranged in layers to form a cylindrical laminated core.

The invention also relates to a soft-magnetic return path element for a miniature drive such as this, comprising a multiplicity of sheet-metal laminates which are in the form of annular disks and are arranged in layers to form a cylindrical laminated core.

Finally, the invention also relates to a method for production of a magnetic return path element such as this.

2. Description of the Prior Art

German utility model DE 90 10 318 U1 describes a miniature electric motor and an associated magnetic return path cylinder of this generic type. In this as half segments and joined together to form a laminated core, thus creating two cylindrical half-shells, which are then connected in an interlocking manner to one another to form the overall magnetic return path cylinder. The individual sheet-metal laminates are integrally connected to one another by being provided with a specific lacquer layer. In order to reduce the laminated cores, the sheet-metal laminates are then heated and are integrally connected to one another via the melting lacquer. The sheet-metal laminates may, however, also be integrally connected by means of an axial weld bead. The laminated magnetic return path cylinder formed in this way is mounted on the stator by force-fitting bracing of two housing halves of an outer motor housing. The production of this known drive and of the magnetic return path element is quite complex and, from the modern point of view, the process is not adequately reliable. Furthermore, quite high eddy-current losses occur because of the large-area electrical connection between the laminated core and the motor housing.

DE 60028427 T2 discloses an assembly method for assembly of a stator of an electric motor, in which the laminated core, which is composed of sheet-metal laminates, is fixed axially within the supporting sleeve by means of end disks which are wedged in the inner wall of the supporting sleeve. With this method, there is a risk that the end disks can tilt, as a result of which the laminated core is not fixed exactly. Furthermore, high eddy-current losses occur because of the large-area contact between the laminated core and the supporting sleeve.

DE 42 24 628 A1 likewise describes a miniature electric motor, although this does not have a laminated magnetic return path element. In fact, a pole housing is composed of a cylindrically shaped, magnetically permeable metal sheet, with the pole housing being closely surrounded by an additional magnetic return path ring, likewise composed of magnetically permeable metal sheet, in order to enlarge the magnetic return path cross section. The magnetic return path element is therefore composed of two coaxial cylindrical metal sheets. The other magnetic return path ring is held axially without any play on the inner pole housing since the magnetic return path ring has cut-free lugs in two areas which axially overhang the pole housing, which lugs are bent around radially inwards once the magnetic return path ring has been pushed axially onto the pole housing, so that they clasp the end faces of the pole housing.

EP 1 501 170 A1 describes an electrical machine with a particular type of stator mounting. The electrical machine comprises a housing, a stator and a rotor. The housing has at least one area which projects inwards, in order to clamp the entire stator in the interior of the housing. This document therefore does not relate to the holding of sheet-metal laminates which are in the form of annular disks and are arranged in layers to form a cylindrical laminated core, but in fact the entire, previously assembled, stator is mounted within a housing without adhesive bonding. The document discloses nothing relating to the initial assembly of the stator with sheet-metal laminates. It can be assumed that the stator laminates are adhesively bonded to one another in the previously normal manner, for which purpose so-called stove enamel is normally used. According to the teaching of this document, only the entire stator is mounted in the outer housing, by clamping and without adhesive bonding, in this way.

A corresponding situation also quite obviously applies to the publication JP 05-199695 A.

US 2003/0098628 A1 describes an electric motor in which a stator core is composed of a plurality of parts via swaged joints.

The further publication US 2005/0269895 A1 describes a brushless DC motor, in which a stator core and a stator winding are jointly encapsulated with resin in order to form a stator subassembly. This encapsulated stator is then pushed into a cylindrical yoke.

A further motor is described in DE 690 04 513 T2 and EP 0 410 933 B1. In this case, the aim is for a stator to be surrounded by a tubular sleeve composed of insulating material, for example synthetic, thermally shrinking polyester film, or an adhesive tape wrapping.

U.S. Pat. No. 2,151,561 A describes an electrical machine in which a laminated core is held in a sleeve. The core is inserted into the interior of the sleeve by introducing the laminates into the sleeve, as a stack. They are then intended to be twisted relative to one another, effectively in the form of a bayonet connection. In one specific relative rotation position, the aim is then to produce a latching connection although there is in any case a radial joint gap between the laminated core and the sleeve in this position, because the sleeve has a cylindrical shape after latching.

Finally, the document U.S. Pat. No. 1,816,859 discloses laminates being connected by means of axial weld lines to form a core. The entire core is then turned over cylindrically, and forced into radial projections on a frame.

SUMMARY OF THE INVENTION

The present invention is based on the object of improving a miniature electrical drive and an associated "laminated" magnetic return path element of the generic type as described above such that optimized magnetic characteristics are achieved with low losses, thus allowing simple, particularly process-reliable and low-cost production. A further aim is also to specify a specific method for production of a magnetic return path element according to the invention.

According to the invention, this is achieved by the features of the respective independent claims 1, 13 and 15. Advantageous refinements are defined in the respective dependent claims.

According to the invention, the sheet-metal laminates of the laminated core are accordingly held axially and radially in a supporting sleeve, which coaxially surrounds them, exclusively by a force fit and in an interlocking manner, and thus without adhesive or integral joint means such as this, to be precise radially via force-fitting contact, which is therefore without play, and axially in an interlocking manner with a prestressing force, which compresses the sheet-metal laminates. In this case, it is advantageous that the sheet-metal laminates in the laminated core make touching contact with the supporting sleeve in the area of their external circumference just at least three, and in particular six, contact points which are distributed around the circumference, and are therefore held without play and with a force fit in the radial direction. Since the supporting sleeve is composed of a very thin metal sheet, in particular the stainless-steel sheet, and therefore does not carry any magnetic flux, the simple point contact between the magnetic return path sheet-metal laminates advantageously results in only very small eddy-current losses. The sheet-metal laminates are expediently composed of a normal magnetic sheet steel, and preferably each have an insulating coating on at least one side. This also advantageously keeps eddy currents very small.

The refinement according to the invention provides a production capability with a reliable process in that the holding of the laminated core with the individual sheet-metal laminates being fixed is ensured exclusively by a force fit and interlock by means of embossed areas which are formed radially inwards on the supporting sleeve.

In one particularly advantageous refinement of the invention, the circumferential contact points of the laminated core are formed by at least three, and preferably six, longitudinal beads on the supporting sleeve, which longitudinal beads project like ribs pointing radially inwards and run in particular parallel to the axis, at least over the entire axial length of the laminated core. In this case, the inner surface, located between the longitudinal beads, of the supporting sleeve forms a clearance fit with little radial play with the laminated core, and the longitudinal beads of said supporting sleeve form an interference fit with the laminated core. In this case, it is advantageous for the longitudinal beads to be formed on the side that points radially inwards to have a slightly spherical shape (convex curvature) in cross section and preferably when seen in the form of a longitudinal section as well. This is a very slight curvature, with the cylindrical cross section of the supporting sleeve merging via slight continuous concave curvatures into the slightly convex curvature of the longitudinal bead. This results in automatic, optimum matching with play compensation to the individual sheet-metal laminates of the laminated core. Furthermore, the layers of the sheet-metal laminates in the laminated core are advantageously held in an axially interlocking manner and with an axial prestressing force between holding embossed areas on the supporting sleeve, which are arranged distributed around the circumference on each axial face, project radially inwards and clasp the respective end ring surface of the laminated core.

In addition, it may also be advantageous for the supporting sleeve according to the invention to provide the attachment for end frames of the miniature drive on both axial faces, by each end frame having a holding section which engages axially in the supporting sleeve, and being attached via holding embossed areas which are arranged distributed over the circumference, project radially inwards and each grip behind a holding edge of the end frame. The end frames are fitted with rotary bearings for a rotary bearing arrangement for a rotor shaft of a rotor which is arranged within the stator. The supporting sleeve according to the invention therefore at the same time also forms an external motor housing for the miniature drive.

With regard to the production method according to the invention, the supporting sleeve is now first of all stamped out from a flat sheet-metal material as a flat blank, and is advantageously provided with the required embossed areas while still in this flat state. Some of the holding embossed areas, with the exception of the holding embossed areas which are provided on an axial face in order to make contact with the laminated core, are then once again deformed back onto the plane of the blank. The flat blank is then formed into the cylindrical shape of the supporting sleeve, in particular by rolling it, with two adjacent longitudinal edges in the circumferential direction being connected to one another by interlocking elements which engage in one another, in particular a so-called Omega fastener ($\Omega$ fastener), and optionally in addition via integral joints at least at points (for example spot welds). In order to form the laminated core, the sheet-metal laminates are stamped out individually in the form of annular disks, and are preferably individually coated with insulation, for example with a suitable lacquer. A corresponding number of sheet-metal laminates are then stacked one on top of the other. According to the invention, the sheet-metal laminates are then pressed together by means of a mandrel apparatus which is suitable for this purpose. With the sheet-metal laminates in this compressed state, with the pressure force applied, the laminated core is then inserted or pushed axially into the supporting sleeve until it makes axial contact with the holding embossed areas which have not previously been deformed back. In this state, the appropriate holding embossed areas are then once again stamped in radially on the other axial face of the laminated core, so that they clasp the end face of the laminated core. Only then is the axial pressure force on the sheet-metal laminates released. The sheet-metal laminates then expand somewhat axially again in the elastic range so that the laminated core rests on the holding embossed areas on the supporting sleeve, prestressed, on both axial faces. This results in the laminated core being held radially via the longitudinal beads with a force fit and without any play, as well as axially between the holding embossed areas in an interlocking manner, and with axial prestressing being maintained.

BRIEF DESCRIPTION OF THE DRAWINGS

The invention will be explained in more detail with reference to one preferred exemplary embodiment, which is illustrated in the drawings, in which:

FIG. 1 shows an axial end view of a miniature electrical drive according to the invention (looking in the direction of the arrow I shown in FIG. 2), FIG. 2 shows a highly enlarged axial section along the section profile II-II in FIG. 1, FIG. 3 shows a separate side view of a magnetic return path element according to the invention, on a smaller scale than that shown in FIG. 2, FIG. 4 shows an end view in the direction of the arrow IV in FIG. 3, FIG. 5 shows an opposite end view in the direction of the arrow V in FIG. 3, FIG. 6 shows an axial section along the section plane VI-VI in FIG. 5, FIG. 7 shows a cross section on the plane VII-VII in FIG. 3, FIG. 8 shows an enlarged illustration of the area VIII in FIG. 7, FIG. 9 shows an enlarged detail view of the area IX in FIG. 6, FIG. 10 shows a further enlarged detail view in the area X in FIG. 6, FIG. 11 shows an enlarged half axial section along the section line XI-XI in FIG. 3, and FIG. 12 shows a view of an originally flat blank for the supporting sleeve according to the invention.

The same parts are always provided with the same reference symbols in the various figures of the drawing.

DETAILED DESCRIPTION OF THE PREFERRED EMBODIMENTS

As is initially evident from FIGS. 1 and 2, a miniature electrical drive 1 (miniature electrical motor) according to the invention comprises a stator 2, a rotor 4 which is arranged such that it can rotate within the stator 2, and a magnetic return path element 6 which cylindrically surrounds the stator 2. The stator 2 comprises a stator core with stator windings 8. The rotor 4 comprises a rotor core 10 with a rotor magnet 12. The rotor shaft 14 is mounted via two rotating bearings 16a and 16b such that it can rotate. Each rotating bearing 16a, 16b is held in one of two end frames 18a, 18b.

The magnetic return path element 6 which cylindrically surrounds the stator 2 has a multiplicity of sheet-metal laminates 22 which are in the form of annular disks and are arranged in layers to form a cylindrical laminated core 20. In this context, reference is also made to the enlarged views, in particular in FIGS. 9 to 11.

According to the invention, the magnetic return path element 6 has a supporting sleeve 24 in which the sheet-metal laminates 22 of the laminated core 20 are held axially and radially, exclusively with a force fit and in an interlocking manner, that is to say without any adhesive or such integral joint means. In this case, the sheet-metal laminates 22 of the laminated core 20 preferably make contact with the supporting sleeve 24 in the region of its external circumference only at points, at least three and preferably six, contact points 26, distributed in particular uniformly over the circumference—in this context, see the illustration in FIG. 7 together with the detail enlargement in FIG. 8—and are therefore held with a force fit at least in the radial direction, but preferably with a component in the axial direction as well. The laminated core 20 is also held in an interlocking manner in the supporting sleeve 24 in the axial direction. For the described means of holding the laminated core 20, the supporting sleeve 24 has suitable embossed areas 28 which project radially inwards (in this context see in particular FIGS. 3, 6 and 12). The laminated core 20 is therefore held within the supporting sleeve 24 in an axially and radially prestressed manner.

The supporting sleeve 24 is preferably composed of a thin metal sheet, whose thickness is very small, in the range from 0.1 to 0.5 mm, in particular about 0.3 mm. This is preferably a stainless steel with a low carbon content. The supporting sleeve 24 therefore does not carry any magnetic flux.

The sheet-metal laminates 22 are composed of a conventional magnetic sheet steel. Each sheet-metal laminate 22 is preferably provided at least on one side with an insulating coating, for example of a suitable lacquer (although this cannot be seen in the drawing). However, this coating does not contribute to the connection of the sheet-metal laminates 22 since, in fact according to the invention, the sheet-metal laminates 22 are held exclusively mechanically in the supporting sleeve 24.

In one preferred refinement, the circumferential contact points 26 of the laminated core 20 (see, once again, FIGS. 7 and 8) are formed by a corresponding number, preferably six, of longitudinal beads 30 on the supporting sleeve 24, which project radially inwards like ribs as embossed areas 28 and in particular run parallel to the axis, at least over the entire axial length of the laminated core 20. As can be seen in particular from FIG. 8, the supporting sleeve 24 with its inner surface located between the longitudinal beads 30 thus forms a clearance fit with a small amount of radial play, and with its longitudinal beads 30 forms an interference fit, without any radial play, with the laminated core 20 and the individual sheet-metal laminates 22. The longitudinal beads 30 are preferably also used for centering of the end frames 18a, 18b, see FIG. 11.

As can best be seen in FIGS. 6, 9 and 10, the layered sheet-metal laminates 22 in the laminated core 20 are held in an axially interlocking manner between holding embossed areas 32 of the supporting sleeve 24 which are arranged distributed circumferentially on each axial face as embossed areas 28, project radially inwards and thus clasp the respective end face of the laminated core 20. As shown in FIGS. 5 and 12, four holding embossed areas 32, for example, can be provided on each axial face. As can be seen in particular from FIGS. 9 and 10, the holding embossed areas 32 are each in the form of a strip which runs in the circumferential direction, is formed from the supporting sleeve 24 via in each case two parallel incisions or stamped-free areas and is embossed in a radially inward convex form from its sleeve shape, which is concave on the inside.

The supporting sleeve 24 is expediently stamped from an originally flat sheet-metal material as a blank 34 (in this context see FIG. 12), and is then formed into its cylindrical shape, in particular by rolling. In this case, two longitudinal edges 36a and 36b which are adjacent to one another in the circumferential direction are connected to one another via interlocking elements 38a, 38b which engage in one another. In the illustrated, preferred embodiment, this is a so-called Omega fastener, with some interlocking elements 38a being in the form of approximately Ω-shaped attachments 40, and the other interlocking elements 38b being in the form of corresponding recesses 42. The attachments 40 engage in an interlocking manner in the recesses 42. Overall, the two longitudinal edges 36a and 36b are therefore shaped with negative contours with respect to one another. In this context, reference is also made to the assembled position shown in FIG. 3. Optionally, the longitudinal edges 36a, b of the supporting sleeve 24 may additionally be connected to one another, at least at points, in an interlocking manner, for example by means of a number of spot welds.

The supporting sleeve 24 of the magnetic return path element 6 according to the invention is advantageously also used to hold the end frames 18a and 18b. For this purpose, each end frame 18a, 18b has a holding section which engages axially in the supporting sleeve 24, and is attached via a plurality of holding embossed areas 44, which are arranged distributed circumferentially, project radially inwards as embossed areas 28, and each engage behind a holding edge of the end frame. As shown in FIG. 12, by way of example, four holding embossed areas 44 can be provided on one axial face and five holding embossed areas 44 can be provided on the other axial face, although this does not represent any restriction. Each of these holding embossed areas 44 is arranged directly in the end-face edge area of the supporting sleeve 24 and is created in the form of a strip by an incision running in the circumferential direction, and projects radially inward, in a convex shape, analogously to the holding embossed areas 32 for the laminated core 20 (in this context, see the illustrations in FIGS. 4 and 5).

As has already been mentioned above, the invention relates not only to the entire miniature drive 1 but also to the major components of the separate magnetic return path element 6. In this context, reference is made to the previous explanatory notes.

The method according to the invention for production of the magnetic return path element 6 will be explained in more detail in the following text. According to the invention, a multiplicity of individual previously stamped-out sheet-metal laminates 22 in the form of annular disks are arranged in layers to form a cylindrical laminated core 20 and in order to hold them, they are inserted into a supporting sleeve 24 such that the sheet-metal laminates 22 are held axially and radially exclusively in a force-fitting and interlocking manner, that is to say without adhesive or such integral joint means. In detail, the following method steps are used for this purpose.

The process starts from a suitable sheet-metal material, in particular from a stainless-steel sheet, a flat blank 34, as is illustrated by way of example in FIG. 12, which is stamped out for the supporting sleeve 24. This blank 34, while still in its flat, planar state, is provided with all the necessary embossed areas 28, to be precise specifically with the longitudinal beads 30 and the holding embossed areas 32 for the laminated core 20 and preferably with the holding embossed areas 44 for the end frames 18*a, b*. With regard to the holding embossed areas 32, 44, sections in the form of strips are in this way cut free or stamped free by means of slots which run in the circumferential direction. The holding embossed areas 32, 44—with the exception of the holding embossed areas 32 which are provided on one axial face in order to make contact with the laminated core 20—are then once again deformed back onto the plane of the flat blank 34. The purpose of this measure will be explained in more detail in the following text.

The flat blank 34 shown in FIG. 12 is then formed into the cylindrical shape of the supporting sleeve 24, in particular by rolling. The two adjacent longitudinal edges 36*a, b* are connected by means of the interlocking elements 38*a, b* which engage in one another, and optionally by means of additional spot integral joints, in particular laser spot welds.

Independently of this described production of the supporting sleeve 24, the sheet-metal laminates 22 are stamped out individually in the form of annular disks, and are preferably coated, for example lacquered, individually to provide insulation. A specific number of sheet-metal laminates 22 are then stacked one on top of the other to form the laminated core 20, depending on the thickness of the individual sheet-metal laminates 22 and the desired axial length of the laminated core 20. The sheet-metal laminates 22 are then pressed together by a suitable stamp. In this state, the radially measured heights of the individual sheet-metal laminates 22 are checked, and if necessary corrected or they are replaced. In order to insert the laminated core 20 which has been initially fixed in this way into the supporting sleeve 24, the sheet-metal laminates 22 are compressed with an axial pressure force such that the entire laminated core 20 is somewhat elastically compressed. In this compressed state, the laminated core 20 is inserted axially into the supporting sleeve 24, to be precise by being pushed in with an interference fit, that is to say a force fit, by virtue of the longitudinal beads 30. This is possible because the holding embossed areas 32 and 44 on this axial face from which the laminated core 20 is pushed in were in fact deformed back again to the cylindrical shape of the supporting sleeve 24. The laminated core 20 is inserted until axial contact is made with those holding embossed areas 32 which have not previously been deformed back on the other axial face. In this still compressed state of the laminated core 20, the holding embossed areas 32 on the other axial face of the laminated core 20 are once again embossed radially inwards, so that they clasp the end face of the laminated core 20, radially and axially. Only then is the axial pressure force on the sheet-metal laminates 22 released. The laminated core 20 then expands elastically again approximately axially, so that the laminated core 20 is located between the axially opposite holding embossed areas 32 in an interlocking manner and with residual prestressing being maintained. A suitable auxiliary tool, which is not illustrated but, for example, is similar to a mandrel and can be guided on the inside by the sheet-metal laminates 22, is used for application of the pressure force.

For subsequent fitting of the end frames 18*a, b*, their holding sections are inserted on both sides into the supporting sleeve 24. This is possible because the holding embossed areas 44 have also previously been deformed back to the cylindrical shape. In order to attach the end frames, the holding embossed areas 44 are then forced radially inwards again. For this purpose, reference is made in FIG. 2 to the holding embossed areas 44 which can be seen in the area of the left-hand end frame 18*b*.

The invention is not restricted to the illustrated and described exemplary embodiments but in fact also covers all equivalent embodiments for the purposes of the invention. Furthermore, the invention has also not been restricted to the feature combination defined in the respective independent claim but can also be defined by any desired other combination of specific features from all of the total of the disclosed individual features. This means that, in principle, virtually any individual feature of the respective independent claim can be omitted or can be replaced by at least one individual feature disclosed elsewhere in the application. To this extent, the claims should be regarded only as a first formulation attempt for an invention.

The invention claimed is:

1. Miniature electrical drive, in particular a rotating field drive with permanent magnet excitation, comprising a stator, a rotor and a soft-magnetic return path element, the stator including a stator core formed of stator windings, the rotor being mounted to rotate within the stator, the return path element cylindrically surrounding the stator and having a multiplicity of sheet-metal laminates in the form of annular disks and arranged in layers to form a cylindrical laminated core, whereby the sheet-metal laminates in the laminated core are held prestressed with a force fit exclusively in the radial direction in a supporting sleeve, whereby the sheet-metal laminates of the laminated core make touching contact with the supporting sleeve in the area of an external circumference of the sheet-metal laminates just at contact points distributed around the external circumference, and are therefore held with a force fit, and the sheet metal laminates in the laminated core are held axially prestressed in an interlocking manner in the axial direction, and without adhesives in the supporting sleeve which coaxially surrounds the sheet-metal laminates, whereby the layered sheet-metal laminates in the laminated core are held axially between holding embossed areas on the supporting sleeve, the holding embossed areas being distributed around the external circumference on each axial face of the laminated core and projecting radially inwards from the supporting sleeve and contacting each axial face.

2. Miniature drive according to claim 1, whereby the supporting sleeve has embossed areas, which are shaped radially inwards, in order to hold the laminated core.

3. Miniature drive according to claim 1, whereby the supporting sleeve is formed from a thin stainless-steel sheet.

4. Miniature drive according to claim 1, whereby the sheet-metal laminates are composed of magnetic sheet steel, preferably with each individual sheet-metal laminate in its own right having an insulating coating.

5. Miniature drive according to claim 1, whereby the circumferential contact points of the laminated core are formed by at least three, and preferably six, longitudinal beads on the supporting sleeve, which longitudinal beads project like ribs pointing radially inwards and run in particular parallel to the axis, at least over the entire axial length of the laminated core, with the inner surface, located between the longitudinal beads, of the supporting sleeve, and with the longitudinal beads of said supporting sleeve forming an interference fit with the laminated core.

6. Miniature drive according to claim 1, whereby the supporting sleeve is stamped as a blank from an originally flat sheet-metal material and is formed into its cylindrical shape, with two mutually adjacent longitudinal edges in the circumferential direction being connected via interlocking elements which engage in one another.

7. Miniature drive according to claim 6, whereby the longitudinal edges are in addition integrally connected at least at points, in particular by means of spot welds, to the interlocking elements which engage in one another.

8. Miniature drive according to claim 1, whereby an end frame is mounted on both axial faces of the supporting sleeve, to be precise preferably by a holding section on each end frame engaging axially in the supporting sleeve and being attached by means of holding embossed areas which are arranged distributed over the circumference, project radially inwards and each engage behind a holding edge on the end frame.

9. Miniature drive according to claim 8, whereby the end frames are centered by means of the longitudinal beads.

10. Miniature drive according to claim 8, whereby the end frames are fitted with a rotating bearing arrangement for a rotor shaft of a rotor which is arranged within the stator.

11. Miniature drive according to claim 1, wherein there are at least three of the contact points.

12. Miniature drive according to claim 1, wherein there are six of the contact points.

13. Method for production of a miniature electric drive, in particular a rotating field drive with permanent magnet excitation, comprising providing a stator, a rotor and a soft magnetic return path element the stator including a stator core formed of stator windings, the rotor being mounted to rotate within the stator, and the return path element cylindrically surrounding the stator and having arranging a multiplicity of individual sheet-metal laminates which are in the form of annular disks in layers to form a cylindrical laminated core and, in order to hold them, inserting the sheet-metal laminates into a supporting sleeve such that the sheet-metal laminates are held prestressed with a force fit exclusively in the radial direction, causing the sheet-metal laminates in the laminated core to make touching contact with the supporting sleeve in the area of an external circumference of the sheet-metal laminates just at contact points distributed around the external circumference and are therefore held with a force fit, and holding the sheet-metal laminates in the laminated core axially prestressed in an interlocking manner in the axial direction, and without adhesive or integral joint means, in the supporting sleeve which coaxially surrounds the sheet-metal laminates, whereby the layered sheet-metal laminates in the laminated core are held axially between holding embossed areas on the supporting sleeve, the holding embossed areas being distributed around the external circumference on each axial face of the laminated core and projecting radially inwards from the supporting sleeve and contacting each axial face.

14. Method according to claim 13, further comprising the following method steps:
   a) A flat blank for the supporting sleeve is stamped out from a sheet-metal material, in particular from a stainless-steel sheet,
   b) the flat blank is provided with all the necessary embossed areas, to be precise with the longitudinal beads and the holding embossed areas for the laminated core and preferably for the end frames,
   c) the holding embossed areas are deformed back onto the plane of the flat blank with the exception of those holding embossed areas which are provided on an axial face in order to make contact with the laminated core,
   d) the flat blank is formed into the cylindrical shape of the supporting sleeve, with two longitudinal edges being connected via the interlocking elements which engage in one another, and preferably via additional spot welds,
   e) a cylindrical laminated core is formed by stacking one on top of the other a multiplicity of sheet-metal laminates which have previously been stamped out individually in the form of annular disks and have preferably been individually coated with insulation,
   f) the sheet-metal laminates are pressed together with a specific pressure force,
   g) the laminated core is inserted axially into the supporting sleeve in the compressed state, with the pressure force applied, of the sheet-metal laminates and with a force-fitting contact with the longitudinal beads until axial contact is made with the holding embossed areas,
   h) the holding embossed areas are once again stamped in radially on the other axial face of the laminated core,
   i) the axial pressure force is released from the sheet-metal laminates, with the laminated core making contact in an interlocking manner between the holding embossed areas that are provided axially on both sides, by axial elastic expansion while maintaining axial prestressing.

* * * * *

UNITED STATES PATENT AND TRADEMARK OFFICE
CERTIFICATE OF CORRECTION

| | | |
|---|---|---|
| PATENT NO. | : 8,143,760 B2 | Page 1 of 1 |
| APPLICATION NO. | : 12/218461 | |
| DATED | : March 27, 2012 | |
| INVENTOR(S) | : Kornelius Reutter et al. | |

It is certified that error appears in the above-identified patent and that said Letters Patent is hereby corrected as shown below:

<u>In the Claims</u>

In column 9, claim 13, line 47, after "the stator and having" delete "arranging".

Signed and Sealed this
Fifth Day of June, 2012

David J. Kappos
*Director of the United States Patent and Trademark Office*